US012760638B2

(12) United States Patent
Bennett et al.

(10) Patent No.: US 12,760,638 B2
(45) Date of Patent: Oct. 13, 2026

(54) TEMPERATURE MODEL BENCHMARKING IN FLOWLINE ENVIRONMENTS

(71) Applicant: Halliburton Energy Services, Inc., Houston, TX (US)

(72) Inventors: David Bennett, Houston, TX (US); Jeremy C. Nicholson, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 424 days.

(21) Appl. No.: 18/476,133

(22) Filed: Sep. 27, 2023

(65) Prior Publication Data

US 2025/0101861 A1 Mar. 27, 2025

(51) Int. Cl.
*E21B 47/095* (2012.01)
*E21B 47/06* (2012.01)
(Continued)

(52) U.S. Cl.
CPC ............ *E21B 47/095* (2020.05); *E21B 47/06* (2013.01); *E21B 47/07* (2020.05); *E21B 47/18* (2013.01);
(Continued)

(58) Field of Classification Search
CPC ........ E21B 47/095; E21B 47/22; E21B 47/07; E21B 47/06; E21B 47/18; E21B 2200/20; F17D 5/06
See application file for complete search history.

(56) References Cited

U.S. PATENT DOCUMENTS

| | | | |
|---|---|---|---|
| 6,401,814 | B1 | 6/2002 | Owens et al. |
| 6,993,963 | B1 | 2/2006 | Gudmundsson |

(Continued)

FOREIGN PATENT DOCUMENTS

| | | | |
|---|---|---|---|
| CN | 104121014 | A | 10/2014 |
| CN | 114961704 | A | 8/2022 |

(Continued)

OTHER PUBLICATIONS

International Patent Application No. PCT/US2023/075253, "International Search Report and Written Opinion", mailed Jun. 17, 2024, 11 pages.

(Continued)

*Primary Examiner* — Catherine T. Rastovski
*Assistant Examiner* — Sharah Zaab
(74) *Attorney, Agent, or Firm* — Kilpatrick Townsend & Stockton LLP

(57) ABSTRACT

A system for benchmarking a flowline temperature model using acoustic detection techniques is disclosed. A predicted velocity of a pressure wave introduced into the flowline by an acoustic detection subsystem can be determined using temperature data from a known temperature model, and an expected time of flight of the pressure wave to a flowline target feature can be calculated using the predicted velocity. An actual time of flight of the pressure wave to the target feature can also be observed from received pressure data, and when the system detects a difference between the actual and predicted times of flight, an actual pressure wave velocity may be calculated based on the actual time of flight. A corrected temperature value corresponding to the actual pressure wave velocity may be subsequently calculated, and the known temperature model can be revised by substituting the corrected temperature value for the predicted temperature value.

20 Claims, 8 Drawing Sheets

(51) Int. Cl.

| | |
|---|---|
| ***E21B 47/07*** | (2012.01) |
| ***E21B 47/18*** | (2012.01) |
| ***E21B 47/22*** | (2012.01) |
| ***F17D 5/06*** | (2006.01) |

(52) U.S. Cl.

CPC ................ *E21B 47/22* (2020.05); *F17D 5/06* (2013.01); *E21B 2200/20* (2020.05)

(56) References Cited

U.S. PATENT DOCUMENTS

| | | | | |
|---|---|---|---|---|
| 10,815,778 | B1 * | 10/2020 | Hou | E21B 21/14 |
| 11,560,792 | B2 | 1/2023 | Zhang et al. | |
| 2009/0165548 | A1 | 7/2009 | Pop et al. | |
| 2014/0036627 | A1 | 2/2014 | Hull et al. | |
| 2014/0352891 | A1 | 12/2014 | Yoshikawa | |
| 2014/0352981 | A1 | 12/2014 | Fripp et al. | |
| 2015/0275639 | A1 * | 10/2015 | Wang | G01N 3/567 73/865.6 |
| 2016/0168978 | A1 * | 6/2016 | Kozak | E21B 47/04 73/152.44 |
| 2017/0089179 | A1 * | 3/2017 | Barfoed | E21B 47/07 |
| 2018/0058189 | A1 * | 3/2018 | Quintero | G01V 1/226 |
| 2018/0298738 | A1 | 10/2018 | Mujica et al. | |
| 2019/0169982 | A1 * | 6/2019 | Hauge | E21B 47/10 |
| 2020/0133251 | A1 * | 4/2020 | Rossi | E21B 43/12 |
| 2021/0032979 | A1 | 2/2021 | Granville et al. | |
| 2021/0032984 | A1 | 2/2021 | Kabannik | |
| 2021/0254451 | A1 | 8/2021 | Haldar et al. | |
| 2021/0293130 | A1 | 9/2021 | Revheim et al. | |
| 2021/0397994 | A1 | 12/2021 | Cerrahoglu et al. | |
| 2022/0243568 | A1 | 8/2022 | Altammar et al. | |
| 2022/0317091 | A1 | 10/2022 | Bennett et al. | |
| 2022/0333477 | A1 | 10/2022 | Kalyanraman et al. | |
| 2022/0404180 | A1 | 12/2022 | Newman et al. | |
| 2023/0108047 | A1 | 4/2023 | Davis et al. | |
| 2023/0147476 | A1 | 5/2023 | Wheelock et al. | |
| 2024/0052714 | A1 | 2/2024 | Bennett et al. | |

FOREIGN PATENT DOCUMENTS

| | | | |
|---|---|---|---|
| EP | 3500725 | B1 | 4/2021 |
| WO | 2019032606 | A1 | 2/2019 |
| WO | 2019135737 | A1 | 7/2019 |
| WO | 2019156661 | A1 | 8/2019 |
| WO | 2019156742 | A1 | 8/2019 |
| WO | 2019199344 | A1 | 10/2019 |
| WO | 2019245583 | A1 | 12/2019 |
| WO | 2020040800 | A1 | 2/2020 |
| WO | 2020117321 | A1 | 6/2020 |
| WO | 2020162964 | A1 | 8/2020 |
| WO | 2021020985 | A1 | 2/2021 |
| WO | 2021148141 | A1 | 7/2021 |
| WO | 2022025790 | A1 | 2/2022 |

OTHER PUBLICATIONS

International Patent Application No. PCT/US2023/075284, "International Search Report and Written Opinion", mailed Jun. 24, 2024, 11 pages.

International Patent Application No. PCT/US2023/075286, "International Search Report and Written Opinion", mailed Jun. 21, 2024, 9 pages.

International Patent Application No. PCT/US2023/075287, "International Search Report and Written Opinion", mailed Jun. 18, 2024, 10 pages.

Adnan et al., "Leak detection in gas pipeline by acoustic and signal processing—A review", IOP Conf. Ser.: Mater. Sci. Eng. 100 012013, 2015, 10 pages.

Alves et al., "A Unified Model for Predicting Flowing Temperature Distribution in Wellbores and Pipelines", SPE Prod Eng 7, 1992, pp. 363-367.

Dung et al., "Practical Applications of Water Hammer Analysis from Hydraulic Fracturing Treatments", Society of Petroleum Engineers, paper presented at the SPE Hydraulic Fracturing Technology Conference and Exhibition, Virtual, May 2021, 47 pages.

Halliburton Energy Services, Inc., "InnerVue Diagnostics", Product Sheet, Jun. 2022, 1 page.

Halliburton Energy Services, Inc., "InnerVue WellSuite Diagnostics Service", Product Sheet, Nov. 2020, 3 pages.

Halliburton Energy Services, Inc., "InnerVue™ Pipeline Blockage Detection: A Non-Intrusive Solution to Locate Blockages and Stuck Pigs", Product Sheet, Jul. 2022, 1 page.

Halliburton Energy Services, Inc., "InnerVue™ Pipeline Deposit Profiling: A Non-Intrusive Solution to Assess Pipeline Deposits", Product Sheet, Jul. 2022, 1 page.

Halliburton Energy Services, Inc., "InnerVue™ Pipeline Leak Detection, Non-Intrusive Location and Quantification of Leaks", Product Sheet, Jul. 2022, 1 page.

Halliburton Energy Services, Inc., "InnerVue™ Pipeline Pig Tracking: Pig Tracking Through Pressure Wave Analysis", Product Sheet, Jul. 2022, 1 page.

Idachaba, "Multiple Surface Pipeline Leak Detection Using Real-Time Sensor Data Analysis", Theses and Dissertations. 4536, https://commons.und.edu/theses/4536, Dec. 2022, 128 pages.

Pourafshary et al., "A compositional wellbore/reservoir simulator to model multiphase flow and temperature distribution", Journal of Petroleum Science and Engineering, vol. 69, Issues 1-2, 2009, pp. 40-52.

Yang et al., "Prediction of wellbore and formation temperatures during circulation and shut-in stages under kick conditions", Energy, vol. 91, 2015, pp. 1018-1029.

* cited by examiner

TEMPERATURE MODEL BENCHMARKING IN FLOWLINE ENVIRONMENTS

TECHNICAL FIELD

The present disclosure relates generally to flowline temperature models, and more particularly although not necessarily exclusively, to benchmarking flowline temperature models in the field to determine model accuracy.

BACKGROUND

Well operators may employ acoustic detection techniques for a number of different purposes. For example, acoustic detection can be used during packer setting operations, or cementing operations, and to detect and locate flowline anomalies such as but not limited to depositions, leaks, blockages, or transient objects. Acoustic detection techniques operate by introducing an acoustic (pressure) wave into a flowline and detecting a reflected wave resulting from contact of the introduced pressure wave with a deposition, leak, blockage, transient object, or other feature present in the flowline. By measuring the time required for return of the reflected pressure wave to a detection sensor, the distance to and resulting location of the feature that reflected the pressure wave can be determined.

Using the time of flight of a pressure wave to calculate the location of a flowline feature requires knowledge of the acoustic velocity of the pressure wave within the flowline, which can be affected by changes in temperature along the length of the flowline. Because the great length of many flowlines makes direct measurement of the flowline temperature profile at least impractical, operators typically rely on existing temperature models for the given flowline environment to determine the (predicted) acoustic velocity of a pressure wave within the flowline. Unfortunately, these temperature models can be inaccurate, and any flowline feature location calculated using an acoustic velocity based on an inaccurate temperature model will likewise be inaccurate.

DETAILED DESCRIPTION

Figure 1:
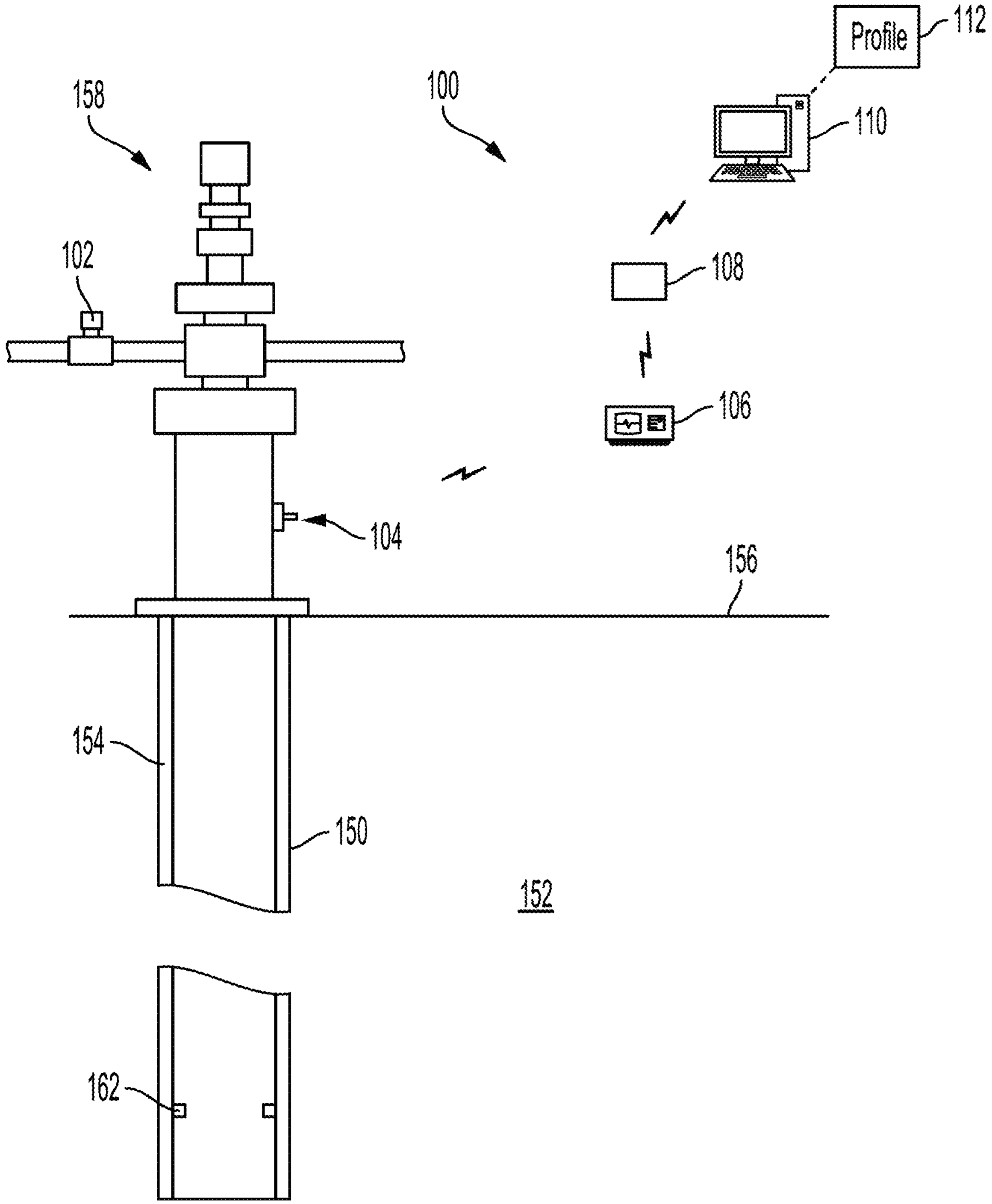
FIG. 1 is a pictorial diagram depicting one example of a benchmarking system for benchmarking an existing temperature model associated with a flowline in the form of a wellbore, according to an example of the present disclosure.

Certain aspects and examples of the present disclosure relate to a system for benchmarking existing (known) temperature models. Benchmarking known temperature models may be beneficial relative to a number of different hydrocarbon well operations, such as but not limited to the acoustic detection-based flowline feature location techniques discussed herein, where a flowline may be a wellbore, a pipeline, or any other fluid-carrying conduit associated with a well operation.

A given flowline temperature environment is typically modeled and estimated based on data gathered in field trials for the environment. The data may then be utilized as input in variations of the Navier-Stokes equations that are used to calculate a predicted temperature model for the environment. Confirming the accuracy of a predicted temperature model is difficult and, therefore, seldom if ever accomplished. As a result, these predicted temperature models can be inaccurate from their onset. Additionally, it is possible for the environmental conditions associated with a given location to change over time, which can cause, or further cause, a predicted temperature model to be inaccurate.

Determining the location of a flowline feature (e.g., anomaly) based on an acoustic detection technique time of flight calculation requires knowledge of the acoustic velocity of the pressure wave within the flowline. In an ideal setting, the pressure wave would travel at the speed of sound. However, in practice, the actual velocity of a pressure wave traveling within a flowline can be affected by, for example, the composition of the fluid within the flowline and the temperature profile along the length of the flowline. Well operators generally know or can determine by various direct measurement techniques, the composition of the fluid within a given flowline, and will thus also typically know the expected velocity of a pressure wave traveling within that fluid. However, because a given flowline may be many thousands of feet long, direct measurement of the temperature profile along the length of the flowline is typically not possible or not practical. Consequently, when determining the acoustic velocity that should be used in feature location calculations based on acoustic detection techniques, operators typically rely on known predicted temperature models, which may be inaccurate.

An inaccurate temperature model is problematic at least because it will also render inaccurate any calculated location of a flow line deposition, leak, blockage, transient object, or other anomaly that utilizes an acoustic velocity based on the inaccurate flowline temperature model. Given the increasing demand for higher accuracy flowline anomaly location prediction, even a slight inaccuracy of the acoustic velocity predicted by a temperature model may be unacceptable.

Aspects of system and method examples can address the problems identified above. System and method examples can employ acoustic detection techniques in cooperation with knowledge of one or more flowline features of known location, to benchmark known temperature models. More specifically, a pressure wave may be introduced to a flowline of interest and pressure data collected from one or more reflected pressure waves may be interrogated to observe one or more (target) features of known location within the flowline. An expected time of flight to the one or more target features may be calculated based on a predicted pressure wave velocity derived from a temperature value(s) of a known temperature model and fluid/gas characteristics at the temperature value(s) from the known temperature model. Additionally, the observed (actual) time of flight of the pressure wave to the one or more target features within the flowline may be directly observed from the collected flowline pressure data. The expected time of flight of the pressure wave may then be compared to the actual time of flight of the pressure wave to detect any difference therebetween.

According to one example, upon detecting a difference between an expected time of flight and an actual time of flight of a pressure wave within the flowline, an actual pressure wave velocity can be calculated based on the actual time of flight and a known distance between the point of introduction of the pressure wave into the flowline (e.g., the location of a pressure wave generating device) and the target feature. A corrected flowline temperature value corresponding to the actual pressure wave velocity may then be calculated, and the temperature model may be revised by substituting the corrected flowline temperature value for the predicted flowline temperature value. The corrected temperature value may be utilized in a subsequent process during which a predicted acoustic velocity is calculated based on the known temperature model. For example, the corrected temperature value may be obtained from the temperature model for use in a subsequently performed flowline feature location calculation based on acoustic detection techniques, whether for the same flowline or for other another flowline(s) within the same or a similar environment to which the known temperature model is applicable. Use of the corrected (benchmarked) temperature value(s) can result in acoustic detection system flowline anomaly location predictions of increased accuracy.

Illustrative examples follow, and are given to introduce the reader to the general subject matter discussed herein rather than to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a pictorial diagram depicting one example of a flowline temperature model benchmarking system (hereinafter "benchmarking system") 100. The benchmarking system 100 includes an acoustic-based feature detection subsystem (hereinafter "acoustic detection subsystem") that can be used to locate depositions, leaks, blockages, transient objects, or other flowline anomalies. For purposes of benchmarking predicted temperature values of a known temperature model, the acoustic detection subsystem can also be used to locate fixed-position (target) features of known location within the flowline.

The benchmarking system 100 is shown in FIG. 1 to be associated with a flowline in the form of a wellbore 150. The benchmarking system 100 of FIG. 1 can be used to benchmark predicted temperature values of a known temperature model associated with the wellbore 150.

It should be understood that the wellbore 150 represented in FIG. 1 may be many thousands of feet deep/long and may also, particularly when the wellbore 150 is part of a hydraulic fracturing well, include a horizontal portion. The wellbore 150 can be formed in a subterranean formation 152 or, alternatively or additionally, in a sub-oceanic formation. The wellbore 150 can be a first wellbore in a set of wellbores of a multi-well pad or other suitable structure or system. The wellbore 150 can include a casing 154 or other suitable component (e.g., a tubing string, etc.) through which fluid produced by the wellbore 150 can be transported to the surface 156. The outflow of fluid from the wellbore 150 can be controlled by various components of a wellhead 158. The fluid from the wellbore 150 can be transferred to a downstream location, such as for example, to a downstream station or treatment facility.

As shown in FIG. 1, the acoustic detection subsystem can comprise several components. For example, the acoustic detection subsystem can include at least a pressure wave generating device 102 for introducing a pressure wave into the wellbore 150, and a sensor 104 for receiving signals comprising reflections of the introduced pressure wave caused by a feature of known location (i.e., a target feature) 162 located within the casing 154 of the wellbore 150. The target feature 162, which may be a feature having a fixed position within the flowline (i.e., a fixed-position feature), is schematically represented in FIG. 1. In actuality, the target feature 162 can comprise, for example and without limitation, a liner end, a coiled tubing end, or a casing joint. It is also possible to install one or more pressure wave-reflecting target features at one or more known locations within the casing 154 of the wellbore 150 specifically for benchmarking purposes. In any case, the distance between the pressure wave generating device 102 of the acoustic detection subsystem and the target feature(s) 162 is known, such as from measurements taken during creation of the wellbore 150 or installation of the casing 154, from a subsequent image-based measurement operation, or by way of other measurement techniques known in the art.

Various types of pressure wave generating devices may be used to introduce a pressure wave into the wellbore 150. In the particular and non-limiting benchmarking system 100 example depicted in FIG. 1, the pressure wave generating device 102 is a valve in fluid communication with the wellbore 150. A temporary closing (e.g., choking) of the valve can be performed to introduce a pressure wave into fluid flowing through the valve and within the casing 154. The pressure wave will thereafter travel within the casing 154 along the length of the wellbore 150 and be reflected by the target feature 162 and possibly by other objects located within the casing 154. In other examples, a pulse generator such as an acoustic wave generator or another suitable device may be used to introduce a pressure wave into the casing 154 of the wellbore 150.

The sensor 104 of the acoustic detection subsystem can be installed at various locations relative to the wellbore 150, as long as the sensor 104 is positioned to detect reflected pressure waves caused by one or more features of known location within the casing 154 of the wellbore 150 as the pressure wave travels therethrough. In the example of the benchmarking system 100 of FIG. 1, the sensor 104 is installed to a portion of the wellhead 158 associated with the wellbore 150, so as to be in fluid communication with the open interior of the casing 154 of the wellbore 150. The sensor 104 can be an acoustic sensor, or another type of sensor that is capable of detecting reflected pressure wave signals and generating corresponding wellbore casing pressure data. The sensor 104 can also be a smart sensor, which is capable of transmitting pressure data directly to a computing device 110 of the benchmarking system 100.

The acoustic detection subsystem according to the example of FIG. 1, can further include a data acquisition device 106, such as a data logger or a similar device or instrument that can record, store or otherwise collect pressure data generated by the sensor 104 in response to the receipt of signals comprising reflections of the pressure wave traveling through the casing 154 of the wellbore 150. The data acquisition device 106 may include a processor and memory that is communicatively coupled to the processor. The memory can further include instructions that are executable by the processor to cause the data acquisition device 106 to perform at least data collection operations. The data acquisition device 106 may be configured to communicate with components of the acoustic detection subsystem via a local interface, or the data acquisition device 106 may include a transceiver or other componentry that provides the data acquisition device 106 with wireless communication capabilities. Wireless communications between the data acquisition device 106 and other components of the acoustic detection subsystem are indicated in FIG. 1 for purposes of illustration.

An example of an acoustic detection subsystem, such as the acoustic detection subsystem of FIG. 1, may also include a controller 108 that is communicatively coupled with or is a part of the data acquisition device 106, and may govern operation of the acoustic detection subsystem. When the controller 108 is a separate component of the acoustic detection subsystem, as is represented in FIG. 1 for purposes of illustration, the controller 108 can include a processor, and memory that is communicatively coupled to the processor and includes instructions that are executable by the processor to cause the processor to perform any of the controller functions described herein. In an example where the controller 108 is instead a part of (i.e., a controller of) the data acquisition device 106, the controller can govern the operations of the data acquisition device 106 as well as the operations of other components of acoustic detection subsystem.

In any case, as the pressure wave introduced by the pressure wave generating device 102 travels through the casing 154 along the length of the wellbore 150, the sensor 104 will receive a signal comprising a reflection of the pressure wave from the target feature 162 located within the casing 154. The sensor 104 may also receive a signal from one or more of a deposition, a leak, a blockage, a transient object, etc., that is present within the casing 154 of the wellbore 150. However, the pressure wave reflection caused by the target feature 162 can be distinguished from possible additional pressure wave reflections caused by such anomalies at least based on differences in the locations of the anomalies within the casing 154 of the wellbore 150 relative to the location of the target feature 162.

One or more pressure waves may be introduced into the casing 154 of the wellbore 150 by the pressure wave generating device 102 to be reflected by one or more target features 162 having known locations within the casing 154. Utilizing multiple target features 162 set at varying distances from the pressure wave generating device 102, and/or introducing multiple pressure waves into the casing 154 of the wellbore 150, will result in a greater amount of pressure data generated by the sensor 104. This larger collection of pressure data can then be analyzed to determine a more accurate actual pressure wave acoustic velocity, as described in more detail below.

Pressure data generated by the sensor 104 of the acoustic detection subsystem can be transmitted directly to the computing device of the benchmarking system 100, such as when the sensor 104 is a smart sensor. In another example, pressure data generated by the sensor 104 may be collected by the data acquisition device 106 of the acoustic detection subsystem, and may be subsequently transmitted by the data acquisition device 106 to the computing device of the benchmarking system 100. In another example, pressure data collected by the data acquisition device 106 of the acoustic detection subsystem may be transmitted to the controller 108 of the acoustic detection subsystem, and may be subsequently transmitted by the controller 108 to the computing device of the benchmarking system 100. Depending on the specific topology of the benchmarking system 100, the pressure data generated by the sensor 104 may be transmitted to the computing device 110 at the instruction of the sensor 104, at the instruction of the data acquisition device 106, at the instruction of the controller 108, at the request of the computing device 110, or otherwise.

The computing device 110 can reside locally to the components of the data acquisition subsystem and may be communicatively coupled to one or more of the sensor 104, the data acquisition device 106, or the controller 108 thereof. In an example, the computing device 110 may be communicatively coupled to one or more of said components of the acoustic detection subsystem via a local interface. In another example, the computing device 110 can reside remotely from the components of the acoustic detection subsystem, and may receive pressure data generated by the sensor 104 over a network, such as but not limited to a local area network (LAN), a wide-area network (WAN) such as the Internet, an institutional network, cellular or other wireless networks, etc.

The computing device 110 may include various programs or applications, or may be otherwise programmed to analyze the pressure data generated by the sensor 104 of the acoustic detection subsystem and to correct detected errors in one or more temperature values of known temperature models. More specifically, the computing device 110 may perform various operations that can include, for example, receiving the pressure data generated by the sensor 104, and calculating an expected time of flight of a pressure wave to the target feature 162 based on a known distance between the pressure wave generating device 102 of the acoustic detection subsystem and the target feature 162 within the casing 154 of the wellbore 150 and a predicted pressure wave velocity derived from a predicted temperature value obtained from a known temperature model 112 and fluid/gas characteristics at the predicted temperature value. Other operations performed by the computing device 110 may include interrogating the pressure data to observe an actual time of flight of the pressure wave to the target feature 162, and detecting a difference between the actual time of flight and the expected time of flight by comparing one to the other. In response to detecting a difference between the actual time of flight and the expected time of flight, the computing device 110 can calculate an actual pressure wave velocity based on the actual time of flight and the known distance between the pressure wave generating device and the target feature, and may also calculate a corrected temperature value that corresponds to the actual pressure wave velocity. The computing device 110 may thereafter output a command to revise the known temperature model by substituting the corrected temperature value for the predicted temperature value.

In some examples, multiple target features may be present within the casing 154 of the wellbore 150, at different known distances from the pressure wave generating device 102. In such an example, the computing device 110 can perform the above-described operations relative to each target feature of the multiple target features. The use of multiple target features can improve the accuracy of calculated actual pressure wave velocities, as an already calculated actual pressure wave velocity, which should be more accurate than a predicted pressure wave velocity, can serve as the initial input velocity in subsequent calculations associated with additional pairs of target features located further downstream. The use of multiple target features may thus be beneficial as the total length of the flowline increases. Performing multiple calculations relative to multiple target features can also allow an operator to see how precisely the system is determining actual pressure wave velocity, as each actual pressure wave velocity determination is based on the same set of pressure wave data.

Upon determining that a given predicted temperature value of the known temperature model is erroneous, the computing device 110 may report the erroneous temperature value. For example, the computing device 110 may generate a notification identifying a predicted temperature value as erroneous, or may send one or more types of communications to relevant personnel, such as personnel operating an acoustic detection system to detect anomalies within the casing 154 of the wellbore 150. When a notification is generated, the notification can be displayed on a monitor or another display device associated with the computing device 110, and/or a display device associated with the acoustic detection subsystem.

It is also possible that after a benchmarking system determines one or more actual pressure wave velocities relative to a given flowline, the acoustic detection subsystem may automatically reinterpret pressure data collected during one or more acoustic detection operations previously conducted on the flowline. More specifically, the acoustic detection subsystem may use an actual pressure wave velocity as determined by an example system to recalculate a previously determined location of a flowline anomaly (e.g., deposition, blockage). Because the previously determined location of the flowline anomaly will have been determined using a predicted pressure wave velocity based on a predicted flowline temperature, which may be erroneous, recalculating the location of the flowline anomaly using the actual pressure wave velocity can provide an operator with a more accurate anomaly location. This process can be repeated for other previously determined flowline anomalies at other locations within the flowline.

Figure 2:
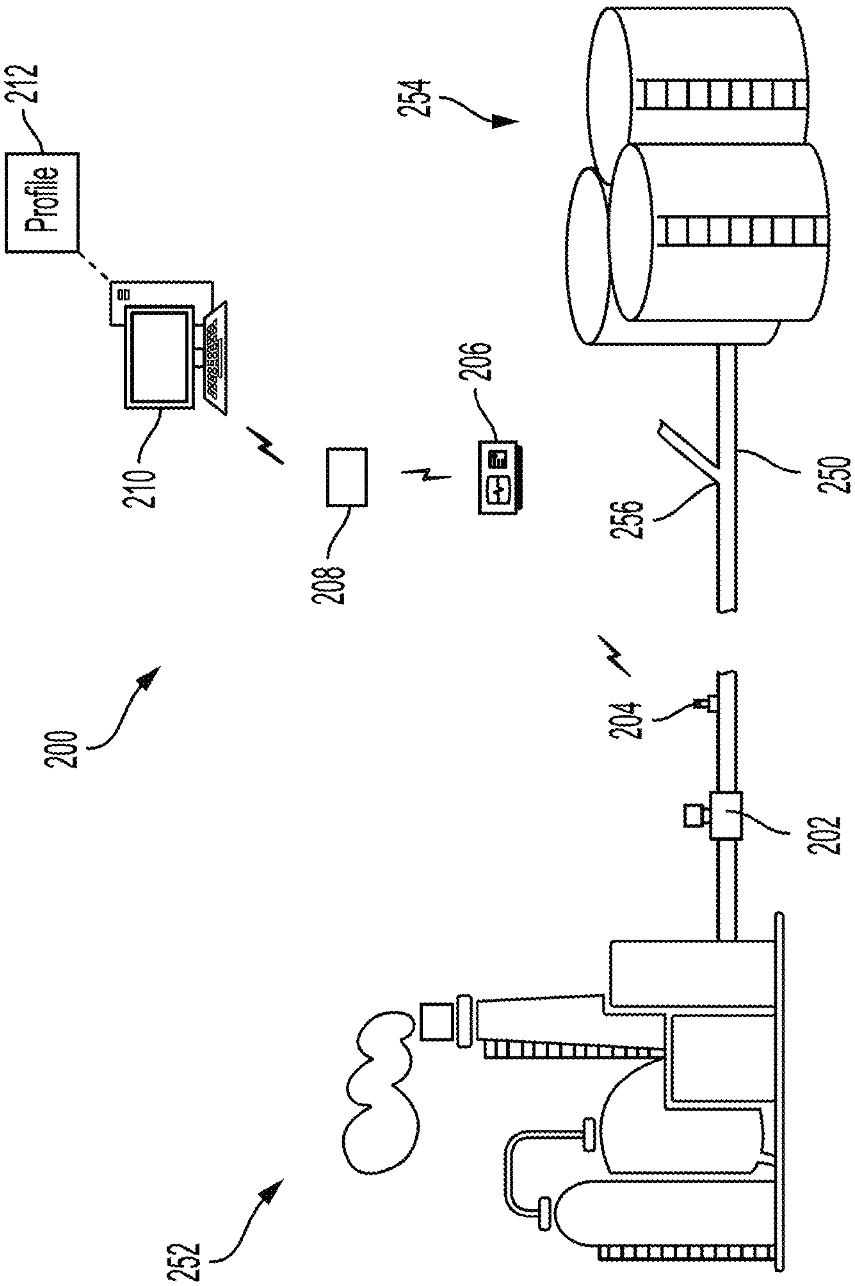
FIG. 2 is a pictorial diagram depicting one example of a benchmarking system for benchmarking an existing temperature model associated with a flowline in the form of a pipeline, according to an example of the present disclosure.

FIG. 2 is a diagram of another example of a benchmarking system 200 for benchmarking a temperature model using a flowline in the form of a pipeline 250. The pipeline 250 can be, for example, a downstream pipeline that may carry well fluid from a processing facility 252 to a storage facility 254, or from another downstream location to a further downstream location. The pipeline 250 depicted in FIG. 2 may be a different type of pipeline in other examples, and nothing herein should be interpreted as limiting a benchmarking system to use with a pipeline of any particular type, size, location, purpose, etc.

In the example of FIG. 2, the benchmarking system 200 may again include an acoustic detection subsystem having the same components with the same functions and interactions as the acoustic detection subsystem of the benchmarking system 100 of FIG. 1. For example, the benchmarking system 200 may include at least a pressure wave generating device 202 for introducing a pressure wave into the pipeline 250, and a sensor 204 for receiving signals comprising reflections of the introduced pressure wave caused by a target feature 256 of known location within the pipeline 250. The target feature 256 which may again be a fixed-position feature and is schematically represented in FIG. 2, can be for example and without limitation, a liner end, a coiled tubing end, a tee line, a wye line, a diameter change, a high-angle bend, or a gap. It is also possible to install one or more pressure wave-reflecting target features at one or more known locations within the pipeline 250 specifically for benchmarking purposes. In any case, the distance between the pressure wave generating device 202 of the acoustic detection subsystem and the target feature(s) 256 is known.

According to the example of FIG. 2, the pressure wave generating device 202 is again a valve that will introduce a pressure wave into fluid flowing through the pipeline 250 when closed, but the pressure wave generating device 202 may be any of the devices described above with respect to the pressure wave generating device 102 of the acoustic detection subsystem, or any other suitable device known in the art. Likewise, the sensor 204 can be any type of sensor described above with respect to the sensor 104 of FIG. 1, or any other suitable sensor known in the art, and may be installed at various locations relative to the pipeline 250 as long as the sensor 204 is positioned to detect reflected pressure waves caused the target feature(s) 256 located within the pipeline 250 as the pressure wave travels therethrough.

Like the acoustic detection subsystem of FIG. 1, the acoustic detection subsystem according to the example of FIG. 2, can further include a data acquisition device 206 that can record, store or otherwise collect pressure data generated by the sensor 204 in response to the receipt of signals comprising reflections of the pressure wave traveling through the pipeline 250. Similarly, the acoustic detection subsystem of FIG. 2, may also include a controller 208 that is communicatively coupled to, or is a part of, the data acquisition device 206. Each of the data acquisition device 206 and the controller 208 may be constructed like, and may function in the same manner, as the data acquisition device 106 and the controller 108 of the acoustic detection subsystem of the benchmarking system 100 of FIG. 1.

As the pressure wave introduced by the pressure wave generating device 202 travels through the pipeline 250, the sensor 204 will receive a signal comprising a reflection of the pressure wave from the target feature 256 located within the pipeline 250. The sensor 204 may also receive a signal from one or more of a deposition, a leak, a blockage, a transient object, etc., that is present within the pipeline 250. However, the pressure wave reflection caused by the target feature 256 is distinguishable from possible additional pressure wave reflections caused by such anomalies at least based on the known location of the target feature 256.

As with the wellbore 150 of FIG. 1, one or more pressure waves may be introduced to the pipeline 250 by the pressure wave generating device 202 to be reflected by one or more target features 256 having known locations within the pipeline 250. As described above, utilizing multiple target features 256 set at varying distances from the pressure wave generating device 202 can improve the accuracy of calculated actual pressure wave velocities and may allow an operator to see how precisely the system is determining actual pressure wave velocity. Likewise, introducing multiple pressure waves into the pipeline 250 and utilizing pressure data generated from each pressure wave may also improve the accuracy of calculated actual pressure wave velocities by allowing for a comparison of calculated actual pressure wave velocities or an averaging thereof.

In the same manner described above with respect to the computing device 110 of FIG. 1, the computing device 210 of the benchmarking system 200 can reside locally to or remotely from the components of the data acquisition subsystem and may be correspondingly communicatively coupled thereto via a local interface or by a network, such as but not limited to the Internet. The computing device 210 may include various programs or applications, or may be otherwise programmed to perform the same operations relative to the pipeline 250 as the computing device 110 has been described to perform relative to the wellbore 150.

Figure 3:
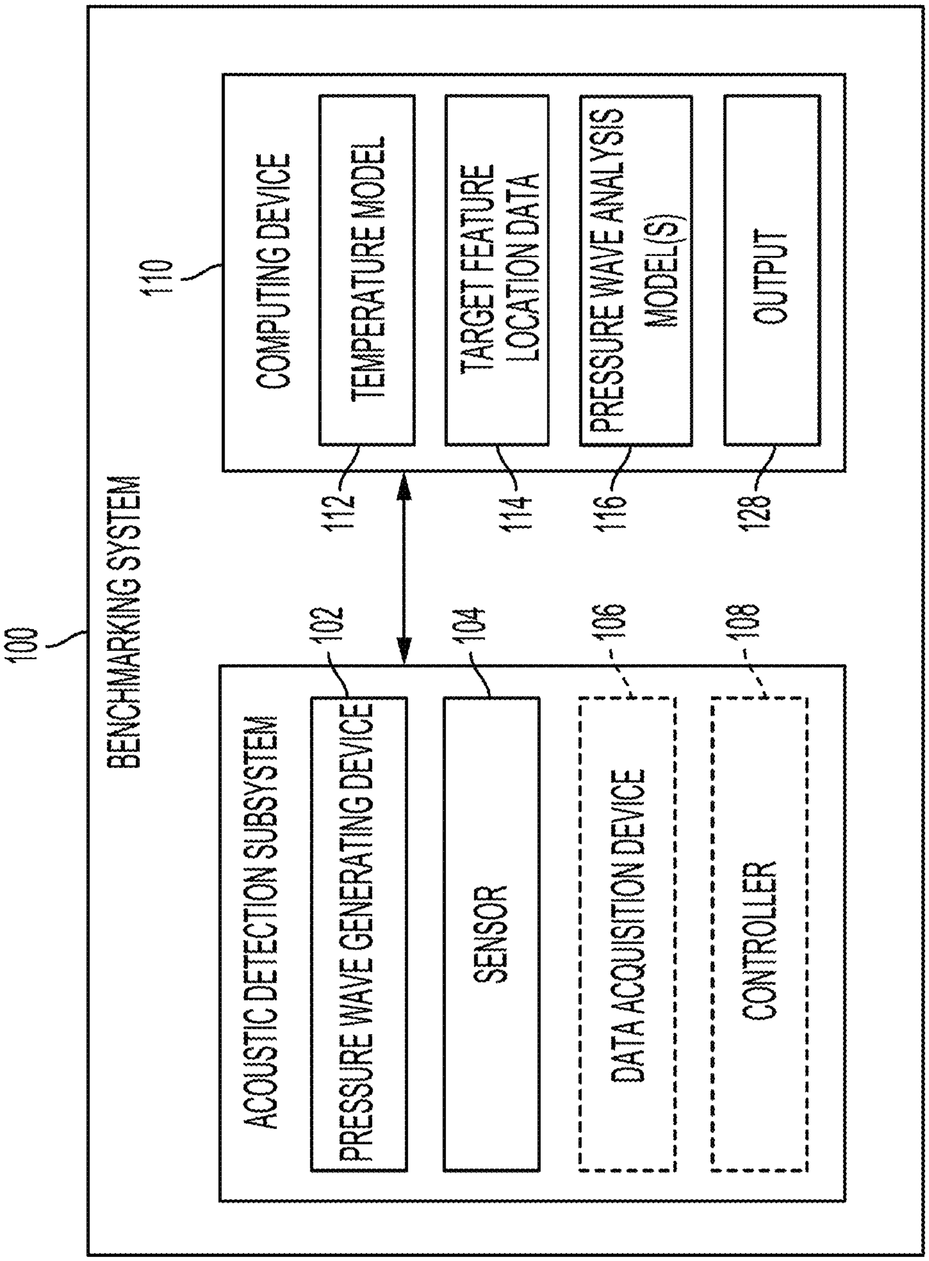
FIG. 3 is a block diagram of a computing environment within which the benchmarking of a temperature model associated with the wellbore of FIG. 1 can be accomplished, according to one example of the present disclosure.

FIG. 3 is a block diagram representing one example of a computing environment within which the benchmarking of pressure wave acoustic velocity within the wellbore 150 of FIG. 1 (or the pipeline 250 of FIG. 2) can be accomplished. As shown, the benchmarking system 100 of FIG. 1 is shown to include the acoustic detection subsystem, which comprises at least the pressure wave generating device 102 and the sensor 104, as previously described. The possible presence of the data acquisition device 106 and the controller 108 is also represented. The acoustic detection subsystem is shown to be communicatively coupled to the computing device 110. In this example, the known temperature model 112 may be stored by, generated by, or otherwise associated with the computing device 110 of the benchmarking system 100. In other examples, the known temperature model may be remote from but accessible by the computing device 110. For example, the known temperature model 112 may be stored by, generated by, or otherwise associated with another system, and predicted temperature values or other data from the known temperature model 112 may be provided to or retrieved by the computing device 110 for use in a benchmarking operation of the benchmarking system 100.

The computing device 110 may also include target feature location data 114, which informs the computing device 110 of the location of the target feature 162, such as in the form of a distance between the pressure wave generating device 102 and the target feature 162. To the extent that the casing 154 of the wellbore 150 includes additional target features, the distances between the pressure wave generating device 102 and each of the additional target features can be stored in the target feature location data 114. As shown in FIG. 3, the computing device 110 may also include one or more pressure wave analysis models 116 that can be used by the system at least in the course of analyzing flowline pressure data and determining actual pressure wave velocity. The computing device 110 may also include an output 128. The output 128 may be, for example, a command to correct and erroneous temperature value located in the known temperature model 112. The output 128 may also be, or may be instead, a notification to a user of the benchmarking system 100 that one or more predicted temperature values of the known temperature model are in error.

Figure 4:
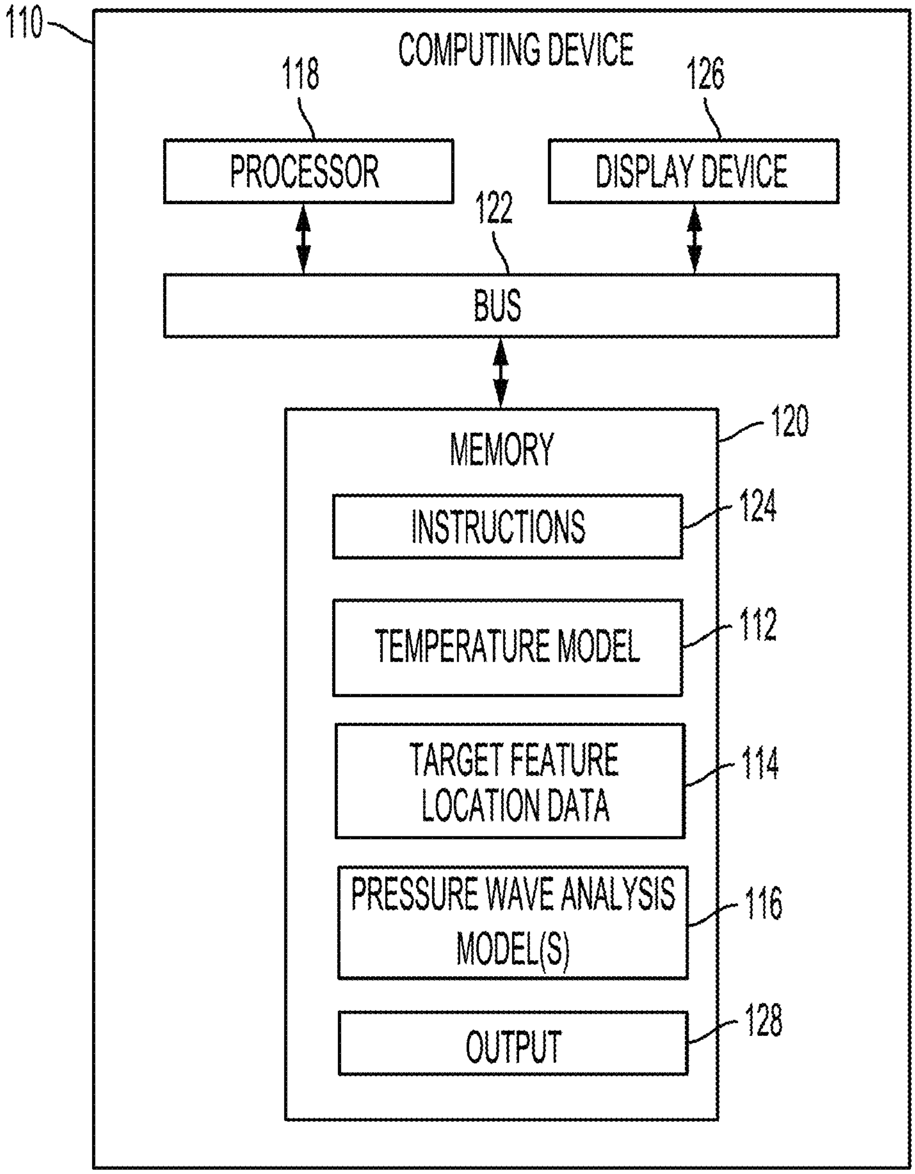
FIG. 4 is a block diagram depicting one example of a computing device for benchmarking an existing temperature model associated with a flowline, according to an example of the present disclosure.

FIG. 4 is a block diagram depicting one example of a computing device for benchmarking the predicted temperature values of a known temperature model. While FIG. 4 depicts the computing device 110 as including certain components, other examples may involve more, fewer, or different components than are shown in FIG. 4.

The computing device 110 of FIG. 4 is shown to include a processor 118 that may be communicatively coupled to a memory 120 by a bus 122. The processor 118 can include one processor or multiple processors. Non-limiting examples of the processor 118 include a Field-Programmable Gate Array (FPGA), an application specific integrated circuit (ASIC), a microprocessor, or any combination of these. Instructions 124 may be stored in the memory 120. The known temperature model 112, the target feature location data 114, and the pressure wave analysis model(s) 116 may also be stored in the memory 120 in this example.

The instructions 124 are executable by the processor 118 for causing the processor 118 to perform various operations. In some examples, the instructions 124 can include processor specific instructions generated by a compiler or an interpreter from code written in any suitable computer-programming language, such as C, C++, C #, Java, or Python. Through the instructions 124, the processor 118 may operate as described above to perform the various operations of the computing device 110 related to benchmarking the known temperature model 112.

The memory 120 can include one memory device or multiple memory devices. The memory 120 can be non-volatile and may include any type of memory device that retains stored information when powered off. Non-limiting examples of the memory 120 include electrically erasable and programmable read-only memory (EEPROM), flash memory, or any other type of non-volatile memory. At least some of the memory device includes a non-transitory computer-readable medium from which the processor 118 can read the instructions 124. A non-transitory computer-readable medium can include electronic, optical, magnetic, or other storage devices capable of providing the processor 118 with the instructions 124 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 124.

When it is determined that a temperature value of the known temperature model 112 is erroneous, the processor 118 may produce the output 128 to correct the error. For example, the processor 118 may output a command to revise the known temperature model 112 by substituting a corrected temperature value for a predicted temperature value of the known temperature model 112, as described above. The output 128 may also include generating a notification identifying the predicted temperature value as erroneous. The output 128, parts of the output, and/or other information can be presented via various mediums, including on a display device 126 that is communicatively coupled to the processor 118 by the bus 122.

Figure 5:
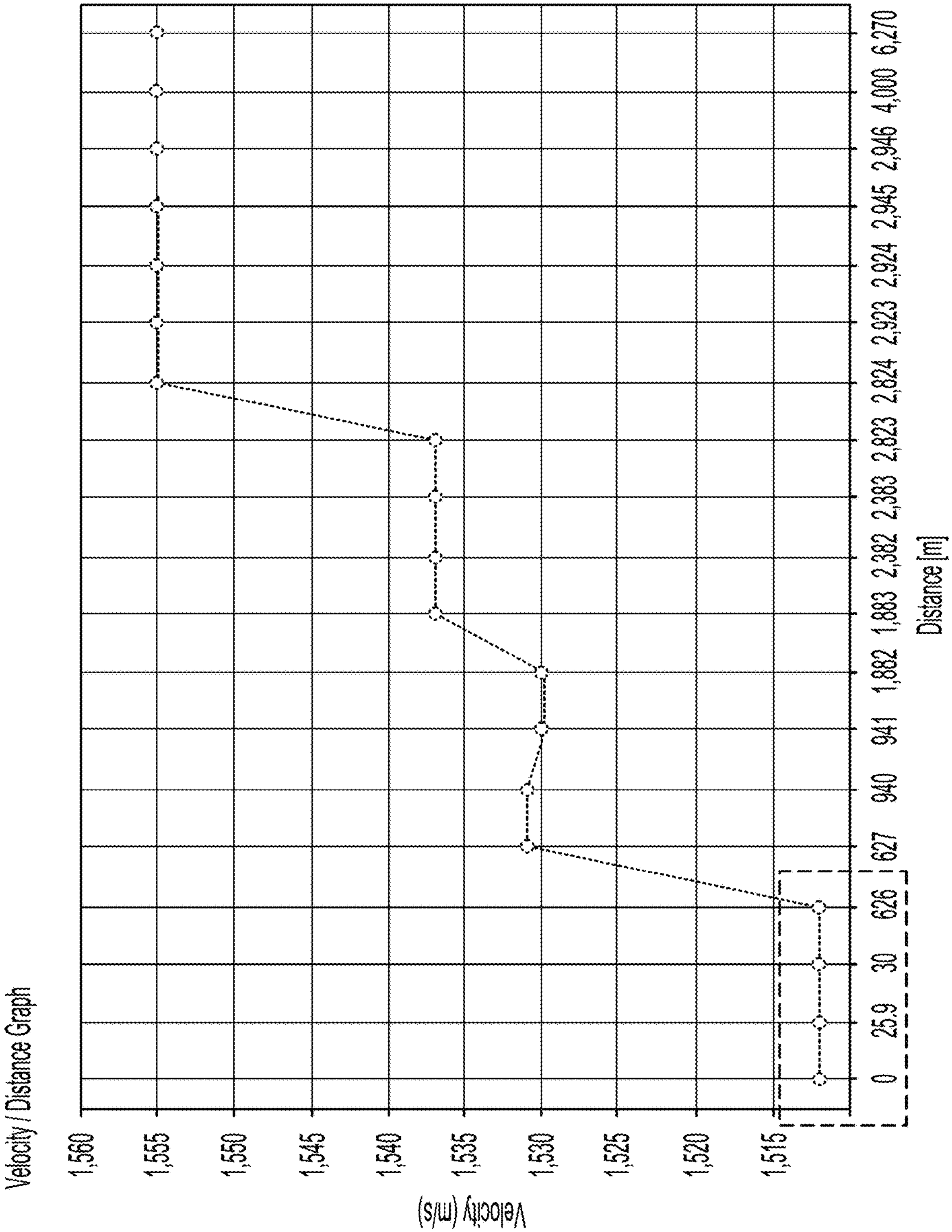
FIG. 5 graphically presents an example of a predicted acoustic velocity profile along the length of a flowline based on predicted temperature values obtained from an existing temperature model.

FIG. 5 is a graphical representation of one example of a predicted pressure wave velocity profile along the length of a flowline extending into a subterranean formation, based on predicted temperature values obtained from a known temperature model and fluid/gas characteristics at the predicted temperature values. As may be observed, the pressure wave velocity is predicted to increase as the depth of the flowline increases (i.e., as the distance from the surface increases), as the temperature of a subterranean formation typically increases with depth and acoustic velocity is normally greater at higher temperature. The depth at which the various sections of the flowline reside within the subterranean formation would be known by the operator, and can be correlated with temperature values in the known temperature model. As highlighted in FIG. 5 by the bounding box located in the lower left corner of the graph, the predicted velocity of the pressure wave along the first 624 meter section of the flowline, at which point a first target feature is located, is calculated to be approximately 1,512 meters per second based on the temperature value from the known temperature model that corresponds to the depth of the first section of the flowline and fluid/gas characteristics at the temperature value obtained from the known temperature model.

Figure 6:
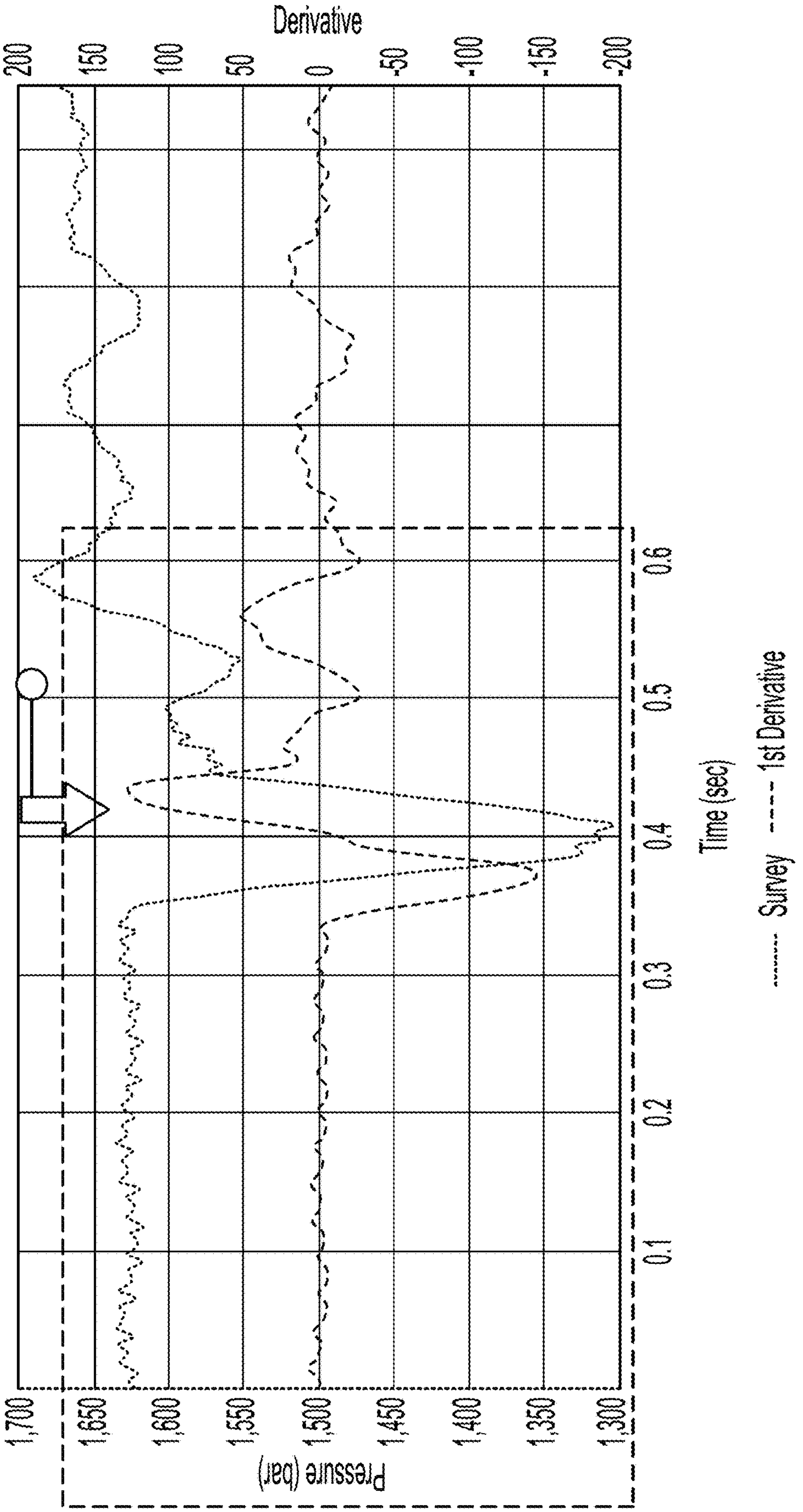
FIG. 6 is a graphical representation of flowline pressure data received by a sensor of an acoustic detection subsystem applied to the flowline represented in FIG. 5, according to an example of the present disclosure.

FIG. 6 is a graphical representation of flowline pressure data received over time by a sensor of an acoustic detection subsystem that has been applied to the flowline represented in FIG. 5 to determine, through acoustic analysis, the location of the target feature residing within the flowline. As may be observed in FIG. 6, a pressure wave was introduced into the flowline by a pressure wave generating device at an initial pressure of between 1,600 bar and 1,650 bar. After approximately 0.41 seconds, the pressure wave contacted the first target feature located within the flowline at 624 meters from the pressure wave generating device, as indicated by the sharp negative pressure spike that is clearly visible in FIG. 6.

Figure 7:
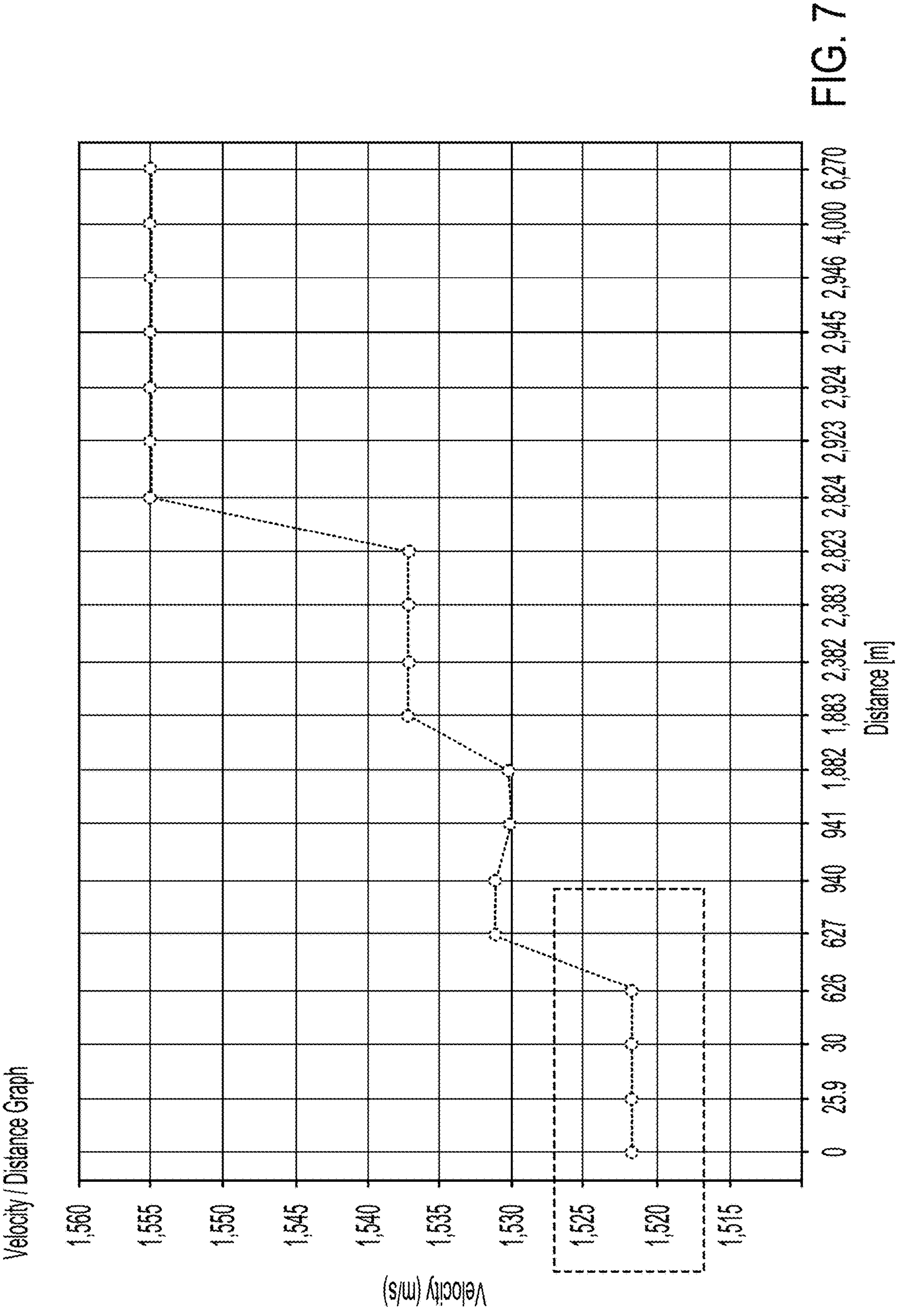
FIG. 7 graphically presents an example of an actual acoustic velocity profile along the length of the flowline of FIG. 5 based on flowline pressure received by a sensor of an acoustic detection subsystem associated with the flowline, according to an example of the present disclosure.

The approximate 0.41 second time of flight of the pressure wave to the target feature observed through interrogation of the flowline pressure data, can be used in conjunction with the known 624 meter distance to the target feature to determine the actual velocity of the pressure wave as it traveled along the first section of the flowline. As is graphically represented in FIG. 7, the actual velocity of the pressure wave within the section of the flowline between the pressure wave generating device (point of pressure wave introduction) and the target feature is calculated to be approximately 1,522 meters per second. Thus, the actual velocity of the pressure wave was about 10 meters per second faster than the predicted pressure wave velocity calculated on the basis of the known temperature model. As should be apparent, such an error in the predicted velocity of the pressure wave can result in inaccurate predicted flowline anomaly locations that are calculated using the predicted pressure wave velocity, especially when it is considered that an anomaly of interest may be located many thousands of feet from an acoustic detection system pressure wave introduction point.

The difference between the actual pressure wave velocity and the predicted pressure wave velocity can be used, as described above, to calculate a corrected temperature value that corresponds to the actual pressure wave velocity. As also described above, the corrected temperature value may then be substituted for the predicted temperature value of the temperature model, to improve future calculations of predicted acoustic velocity that are based on corrected temperature value.

Figure 8:
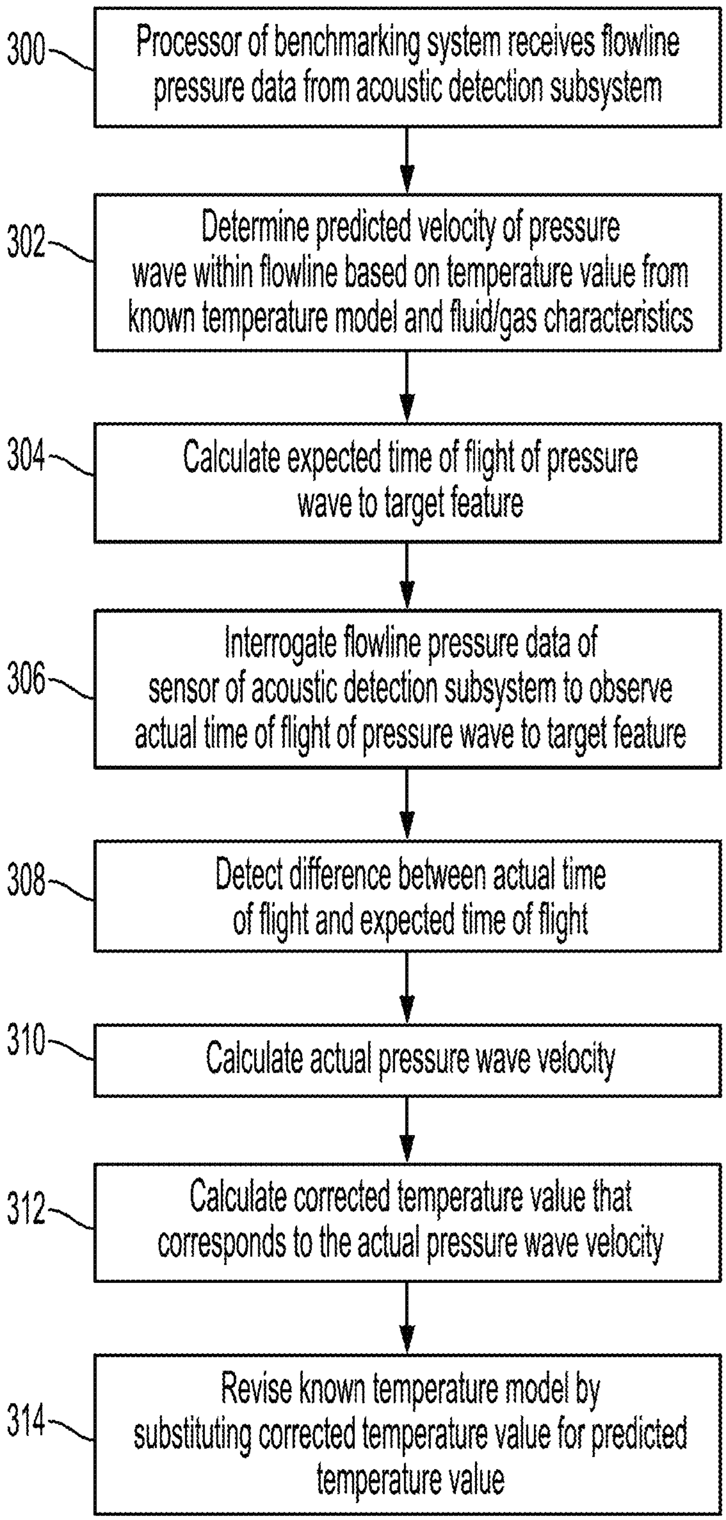
FIG. 8 is a flow chart representing one example of a method for benchmarking an existing temperature model according to an example of the present disclosure.

FIG. 8 is a flow chart representing a method for benchmarking a known temperature model. As represented in FIG. 8, at block 300, a processor of a temperature model benchmarking system receives, from an acoustic detection subsystem, flowline pressure data from a detected reflection of a pressure wave caused by a target feature residing within the flowline at a known distance from a pressure wave generating device. At block 302, the processor can determine a predicted pressure wave velocity within a section of the flowline between the pressure generation device and the target feature, based on a temperature value obtained from a known temperature model corresponding to the section of the flowline between the pressure generation device and the target feature and fluid/gas characteristics at the temperature value obtained from the known temperature model. The known temperature model may include a plurality of predicted temperature values that form a predicted temperature profile of the flowline along a length thereof. At block 304, the processor can calculate an expected time of flight of the pressure wave to the target feature based on the predicted pressure wave velocity and a known distance between the pressure wave generating device and the target feature.

At block 306, the processor can interrogate flowline pressure data of a sensor of the acoustic detection subsystem to observe an actual time of flight of the pressure wave to the target feature. Interrogation of the flowline pressure data can include identifying, in graphs of the flowline pressure over time, pressure spikes or other indicators of contact of the pressure wave with the target feature. At block 308, the processor can detect a difference between the actual time of flight and the expected time of flight. Detecting a difference between the actual time of flight and the expected time of flight may involve simply comparing one to the other. In some examples, a difference value may also be noted and saved for possible later use.

In response to detecting a difference between the actual time of flight and the expected time of flight, the processor can then, at block 310, calculate an actual pressure wave velocity. The actual pressure wave velocity can be calculated using the actual time of flight and the known distance between the pressure wave generating device and the target feature. With the actual pressure wave velocity so calculated, the processor may then, at block 312, calculate a corrected temperature value that corresponds to the actual pressure wave velocity. The processor may include, or have access to, correlated temperature-velocity data for this purpose. The data may be experimental or other data that provides known acoustic velocities in different fluids at different temperatures, or other data by which the actual pressure wave velocity can be calculated. According to block 314, the processor can then output a command to revise the known temperature model by substituting the corrected temperature value for the predicted temperature value. For example, the processor may communicate with a database or another data store containing the predicted temperature values, and make the appropriate substitution. In at least some examples, the need for correction of a given predicted temperature value can also be communicated to a user.

According to aspects of the present disclosure, a system, a non-transitory computer-readable medium, and a method, are provided according to one or more of the following examples. As used below, any reference to a series of examples is to be understood as a reference to each of those examples disjunctively (e.g., “Examples 1-4” is to be understood as “Examples 1, 2, 3, or 4”).

Example 1 is a system, comprising: an acoustic detection subsystem to generate flowline pressure data from a detected reflection of a pressure wave caused by a target feature residing within the flowline at a known distance from a pressure wave generating device; and a computing device communicatively coupled to the acoustic detection subsystem and comprising: a processor; and a non-transitory computer-readable medium having instructions stored thereon that are executable by the processor for causing the processor to perform operations comprising: accessing a known temperature model including a plurality of predicted temperature values that form a predicted temperature profile of the flowline along a length thereof; determining a predicted pressure wave velocity within a section of the flowline between the pressure generation device and the target feature, the predicted pressure wave velocity determined based on a temperature value from the known temperature model that corresponds to the section of the flowline between the pressure generation device and the target feature and fluid/gas characteristics at the temperature value from the known temperature model; calculating an expected time of flight of the pressure wave to the target feature based on the predicted pressure wave velocity and the known distance between the pressure wave generating device and the target feature; interrogating flowline pressure data of a sensor of the acoustic detection subsystem to observe an actual time of flight of the pressure wave to the target feature; detecting a difference between the actual time of flight and the expected time of flight; in response to detecting the difference between the actual time of flight and the expected time of flight, calculating an actual pressure wave velocity based on the actual time of flight and the known distance between the pressure wave generating device and the target feature; calculating a corrected temperature value that corresponds to the actual pressure wave velocity; and outputting a command to revise the known temperature model by substituting the corrected temperature value for the predicted temperature value.

Example 2 is the system of example 1, wherein the flowline is a wellbore or a pipeline.

Example 3 is the system of example 1, wherein the acoustic detection subsystem further includes a data acquisition device that is communicatively coupled to the sensor to receive and collect the flowline pressure data generated by the sensor, and the computing device is communicatively coupled to the data acquisition device and receives the flowline pressure data therefrom.

Example 4 is the system of example 1, wherein the target feature has a fixed position within the flowline.

Example 5 is the system of example 1, wherein the target feature is selected from the group consisting of a liner end, a coiled tubing end, a tee line, a wye line, a casing joint, a diameter change, a high-angle bend, and a gap.

Example 6 is the system of example 1, wherein multiple target features are present in the flowline at different known distances from the pressure wave generating device, and the sensor is positioned to generate flowline pressure data from which an actual time of flight of the pressure wave to each target feature of the multiple target features is observable.

Example 7 is the system of example 6, wherein the instructions are executable by the processor of the computing device for causing the processor to perform the operations relative to each target feature of the multiple target features.

Example 8 is a method, comprising: receiving, by a processor of a computing device, from an acoustic detection subsystem, flowline pressure data from a detected reflection of a pressure wave caused by a target feature residing within the flowline at a known distance from a pressure wave generating device; and performing, by the processor, each of the following additional operations: determining a predicted pressure wave velocity within a section of the flowline between the pressure generation device and the target feature based on a temperature value obtained from a known temperature model and fluid/gas characteristics at the temperature value obtained from the known temperature model, wherein the temperature model includes a plurality of predicted temperature values that form a predicted temperature profile of the flowline along a length thereof and the temperature value obtained from the temperature model corresponds to the section of the flowline between the pressure generation device and the target feature; calculating an expected time of flight of the pressure wave to the target feature based on the predicted pressure wave velocity and the known distance between the pressure wave generating device and the target feature; interrogating flowline pressure data of a sensor of the acoustic detection subsystem to observe an actual time of flight of the pressure wave to the target feature; detecting a difference between the actual time of flight and the expected time of flight; in response to detecting the difference between the actual time of flight and the expected time of flight, calculating an actual pressure wave velocity based on the actual time of flight and the known distance between the pressure wave generating device and the target feature; calculating a corrected temperature value that corresponds to the actual pressure wave velocity; and outputting a command to revise the known temperature model by substituting the corrected temperature value for the predicted temperature value.

Example 9 is the method of example 8, wherein the flowline is a wellbore or a pipeline.

Example 10 is the method of example 8, wherein the target feature has a fixed position within the flowline.

Example 11 is the method of example 8, wherein the target feature is selected from the group consisting of a liner end, a coiled tubing end, a tee line, a wye line, a casing joint, a diameter change, a high-angle bend, and a gap.

Example 12 is the method of example 8, wherein multiple target features are present in the flowline at different known distances from the pressure wave generating device, and the sensor generates flowline pressure data from which an actual time of flight of the pressure wave to each target feature of the multiple target features is observed.

Example 13 is the method of example 12, wherein the operations performed by the processor are performed relative to each target feature of the multiple target features.

Example 14 is the method of example 8, further comprising utilizing the corrected temperature value in a subsequent process during which a predicted acoustic velocity is calculated based on the known temperature model.

Example 15 is the method of example 14, wherein: the subsequent process detects anomalies within a flowline using pressure data generated by an acoustic detection subsystem; and the flowline is located in a formation to which the known temperature model is applicable.

Example 16 is a non-transitory computer-readable medium comprising instructions that are executable by a processor of a computing device, for causing the processor to: receive, from an acoustic detection subsystem, flowline pressure data from a detected reflection of a pressure wave caused by a target feature residing within the flowline at a known distance from a pressure wave generating device; and perform each of the following operations: determine a predicted pressure wave velocity within a section of the flowline between the pressure generation device and the target feature based on a temperature value obtained from a known temperature model and fluid/gas characteristics at the temperature value obtained from the known temperature model, wherein the temperature model includes a plurality of predicted temperature values that form a predicted temperature profile of the flowline along a length thereof and the temperature value obtained from the temperature model corresponds to the section of the flowline between the pressure generation device and the target feature; calculate an expected time of flight of the pressure wave to the target feature based on the predicted pressure wave velocity and the known distance between the pressure wave generating device and the target feature; interrogate the flowline pressure data to observe an actual time of flight of the pressure wave to the target feature; detect a difference between the actual time of flight and the expected time of flight; in response to detecting the difference between the actual time of flight and the expected time of flight, calculate an actual pressure wave velocity based on the actual time of flight and the known distance between the pressure wave generating device and the target feature; calculate a corrected temperature value that corresponds to the actual pressure wave velocity; and output a command to revise the known temperature model by substituting the corrected temperature value for the predicted temperature value.

Example 17 is the non-transitory computer-readable medium of example 16, wherein the flowline is a wellbore or a pipeline.

Example 18 is the non-transitory computer-readable medium of example 16, wherein the target feature has a fixed position within the flowline.

Example 19 is the non-transitory computer-readable medium of example 16, wherein the target feature is selected from the group consisting of a liner end, a coiled tubing end, a tee line, a wye line, a casing joint, a diameter change, a high-angle bend, and a gap.

Example 20 is the non-transitory computer-readable medium of example 16, wherein: multiple target features are present in the flowline at different known distances from the pressure wave generating device, and the sensor generates flowline pressure data from which an actual time of flight of the pressure wave to each target feature of the multiple target features is observable; and the instructions are executable by the processor to cause the processor to perform the operations relative to each target feature of the multiple target features.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:

an acoustic detection subsystem comprising:

a pressure wave generating device positionable to introduce a pressure wave into a flowline, a sensor physically positionable in fluid communication with the flowline to generate flowline pressure data from a detected reflection of a pressure wave caused by a target feature residing within the flowline at a known distance from the pressure wave generating device, and a data acquisition device communicatively couplable to the sensor to collect and transmit the flowline pressure data; and a computing device communicatively coupled to the acoustic detection subsystem and comprising:

a processor; and a non-transitory computer-readable medium having instructions stored thereon that are executable by the processor for causing the computing device to perform operations comprising:

accessing a known temperature model including a plurality of predicted temperature values that form a predicted temperature profile of the flowline along a length thereof;

determining a predicted pressure wave velocity within a section of the flowline between the pressure wave generation device and the target feature, the predicted pressure wave velocity determined based on a temperature value from the known temperature model that corresponds to the section of the flowline between the pressure wave generation device and the target feature and fluid/gas characteristics at the temperature value from the known temperature model;

calculating an expected time of flight of the pressure wave to the target feature based on the predicted pressure wave velocity and the known distance between the pressure wave generating device and the target feature;

interrogating flowline pressure data generated by the sensor and received from the data acquisition device of the acoustic detection subsystem to observe an actual time of flight of the pressure wave to the target feature;

detecting a difference between the actual time of flight and the expected time of flight;

in response to detecting the difference between the actual time of flight and the expected time of flight, calculating an actual pressure wave velocity based on the actual time of flight and the known distance between the pressure wave generating device and the target feature;

calculating a corrected temperature value that corresponds to the actual pressure wave velocity; and outputting a command to revise the known temperature model by substituting the corrected temperature value for the predicted temperature value.

2. The system of claim 1, wherein the flowline is a wellbore or a pipeline.

3. The system of claim 1, wherein the pressure wave generating device is an acoustic pulse generator, or a valve that is in fluid communication with the flowline and temporary closable to introduce a pressure wave into the flowline by interrupting a flow of fluid through the flowline.

4. The system of claim 1, wherein the target feature has a fixed position within the flowline.

5. The system of claim 1, wherein the target feature is selected from the group consisting of a liner end, a coiled tubing end, a tee line, a wye line, a casing joint, a diameter change, a high-angle bend, and a gap.

6. The system of claim 1, wherein the target feature is multiple target features that are present in the flowline at different known distances from the pressure wave generating device, and the sensor positionable to generate flowline pressure data from which an actual time of flight of the pressure wave to each target feature of the multiple target features is observable.

7. The system of claim 6, wherein the instructions are executable by the processor of the computing device for causing the computing device to perform the operations relative to each target feature of the multiple target features.

8. A computer-implemented method, comprising:

receiving, by a processor of a computing device, from a data acquisition device of an acoustic detection subsystem that further includes a pressure wave generating device and a sensor that is physically positioned in fluid communication with a flowline and communicatively coupled to the data acquisition device, flowline pressure data generated by the sensor from a detected reflection of a pressure wave introduced into the flowline by the pressure wave generating device, where the reflection is caused by a target feature residing within the flowline at a known distance from the pressure wave generating device; and performing, by the computing device, each of the following additional operations:

determining a predicted pressure wave velocity within a section of the flowline between the pressure wave generation device and the target feature based on a temperature value obtained from a known temperature model and fluid/gas characteristics at the temperature value obtained from the known temperature model, wherein the temperature model includes a plurality of predicted temperature values that form a predicted temperature profile of the flowline along a length thereof and the temperature value obtained from the temperature model corresponds to the section of the flowline between the pressure wave generation device and the target feature;

calculating an expected time of flight of the pressure wave to the target feature based on the predicted pressure wave velocity and the known distance between the pressure wave generating device and the target feature;

interrogating the flowline pressure data received from the data acquisition device of the acoustic detection subsystem to observe an actual time of flight of the pressure wave to the target feature;

detecting a difference between the actual time of flight and the expected time of flight;

in response to detecting the difference between the actual time of flight and the expected time of flight, calculating an actual pressure wave velocity based on the actual time of flight and the known distance between the pressure wave generating device and the target feature;

calculating a corrected temperature value that corresponds to the actual pressure wave velocity; and outputting a command that causes the known temperature model to be revised by substituting the corrected temperature value for the predicted temperature value.

9. The computer-implemented method of claim 8, wherein the flowline is a wellbore or a pipeline.

10. The computer-implemented method of claim 8, wherein the target feature has a fixed position within the flowline.

11. The computer-implemented method of claim 8, wherein the target feature is selected from the group consisting of a liner end, a coiled tubing end, a tee line, a wye line, a casing joint, a diameter change, a high-angle bend, and a gap.

12. The computer-implemented method of claim 8, wherein multiple target features are present in the flowline at different known distances from the pressure wave generating device, and the sensor generates flowline pressure data from which an actual time of flight of the pressure wave to each target feature of the multiple target features is observed.

13. The computer-implemented method of claim 12, wherein the operations performed by the computing device are performed relative to each target feature of the multiple target features.

14. The computer-implemented method of claim 8, further comprising utilizing the corrected temperature value in a subsequent process during which a predicted acoustic velocity is calculated based on the known temperature model.

15. The computer-implemented method of claim 14, wherein the flowline is located in a formation to which the known temperature model is applicable.

16. A non-transitory computer-readable medium comprising instructions that are executable by a processor of a computing device, for causing the computing device to:

receive, from a data acquisition device of an acoustic detection subsystem that further includes a pressure wave generating device and a sensor that is physically positioned in fluid communication with a flowline and communicatively coupled to the data acquisition device, flowline pressure data generated by the sensor from a detected reflection of a pressure wave introduced into the flowline by the pressure wave generating device, where the reflection is caused by a target feature residing within the flowline at a known distance from the pressure wave generating device; and perform each of the following operations:

determine a predicted pressure wave velocity within a section of the flowline between the pressure wave generation device and the target feature based on a temperature value obtained from a known temperature model and fluid/gas characteristics at the temperature value obtained from the known temperature model, wherein the temperature model includes a plurality of predicted temperature values that form a predicted temperature profile of the flowline along a length thereof and the temperature value obtained from the temperature model corresponds to the section of the flowline between the pressure wave generation device and the target feature;

calculate an expected time of flight of the pressure wave to the target feature based on the predicted pressure wave velocity and the known distance between the pressure wave generating device and the target feature;

interrogate the flowline pressure data received from the data acquisition device of the acoustic detection subsystem to observe an actual time of flight of the pressure wave to the target feature;

detect a difference between the actual time of flight and the expected time of flight;

in response to detecting the difference between the actual time of flight and the expected time of flight, calculate an actual pressure wave velocity based on the actual time of flight and the known distance between the pressure wave generating device and the target feature;

calculate a corrected temperature value that corresponds to the actual pressure wave velocity; and output a command to revise the known temperature model by substituting the corrected temperature value for the predicted temperature value.

17. The non-transitory computer-readable medium of claim 16, wherein the flowline is a wellbore or a pipeline.

18. The non-transitory computer-readable medium of claim 16, wherein the target feature has a fixed position within the flowline.

19. The non-transitory computer-readable medium of claim 16, wherein the target feature is selected from the group consisting of a liner end, a coiled tubing end, a tee line, a wye line, a casing joint, a diameter change, a high-angle bend, and a gap.

20. The non-transitory computer-readable medium of claim 16, wherein:

the target feature is multiple target features that are present in the flowline at different known distances from the pressure wave generating device, and the sensor of the acoustic detection subsystem is positionable to generate flowline pressure data from which an actual time of flight of the pressure wave to each target feature of the multiple target features is observable; and the instructions are executable by the processor to cause the computing device to perform the operations relative to each target feature of the multiple target features.

* * * * *